United States Patent
Akechi (10) Patent No.: US 10,940,825 B2
(45) Date of Patent: Mar. 9, 2021

(54) COATED BASE FABRIC FOR AIRBAG AND METHOD FOR MANUFACTURING SAME

(71) Applicant: TOYOBO CO., LTD., Osaka (JP)

(72) Inventor: Tsutomu Akechi, Shiga (JP)

(73) Assignee: TOYOBO CO., LTD., Osaka (JP)

(*) Notice: Subject to any disclaimer, the term of this patent is extended or adjusted under 35 U.S.C. 154(b) by 53 days.

(21) Appl. No.: 16/084,398

(22) PCT Filed: Mar. 13, 2017

(86) PCT No.: PCT/JP2017/009865
§ 371 (c)(1),
(2) Date: Sep. 12, 2018

(87) PCT Pub. No.: WO2017/159583
PCT Pub. Date: Sep. 21, 2017

(65) Prior Publication Data
US 2019/0071048 A1 Mar. 7, 2019

(30) Foreign Application Priority Data

Mar. 16, 2016 (JP) .............................. JP2016-052395

(51) Int. Cl.
*B60R 21/235* (2006.01)
*D06N 3/00* (2006.01)
(Continued)

(52) U.S. Cl.
CPC .......... *B60R 21/235* (2013.01); *D06M 15/643* (2013.01); *D06N 3/0006* (2013.01);
(Continued)

(58) Field of Classification Search
CPC ....... B60R 2021/23514; B60R 21/235; D06M 15/643; D06N 2209/103; D06N 2211/268;
(Continued)

(56) References Cited

U.S. PATENT DOCUMENTS

| 6,231,927 B1 | 5/2001 | Ruid |
| 2007/0031621 A1 | 2/2007 | Morimoto et al. |

(Continued)

FOREIGN PATENT DOCUMENTS

| CN | 1703550 | 11/2005 |
| CN | 101657578 | 2/2010 |

(Continued)

OTHER PUBLICATIONS https://patents.google.com/patent/WO2005108671A3/en?oq=WO2005108671 (Year: 2004).*

(Continued)

*Primary Examiner* — Arti Singh-Pandey
(74) *Attorney, Agent, or Firm* — Fish & Richardson P.C.

(57) ABSTRACT

The present invention relates to a coated fabric for airbags for use in automobiles, and provides a coated fabric that has eliminated or reduced coating agent dots, which are not solved in traditional techniques, and that has a smaller difference in physical properties in tear strength in the width direction of the fabric. The coated fabric for airbags that exhibit excellent fabric properties and appearance such that there is little variation in physical properties in the width direction of the fabric, and such that there are fewer coating agent dots can be provided by a production method characterized by the use of a knife-on-air technique as a resin coating method, the use of a knife whose front and rear part are differently shaped, and the running angle of the fabric when the knife is pressed on the fabric being 3 to 15′.

18 Claims, 3 Drawing Sheets

(51) Int. Cl.
*D06N 3/12* (2006.01)
*D06M 15/643* (2006.01)

(52) U.S. Cl.
CPC .......... *D06N 3/0088* (2013.01); *D06N 3/128* (2013.01); *B60R 2021/23514* (2013.01); *D06N 2209/103* (2013.01); *D06N 2211/268* (2013.01)

(58) Field of Classification Search
CPC .... D06N 3/0006; D06N 3/0088; D06N 3/128; G06F 17/5018; C08J 2351/00; C08J 3/07; C08J 2323/02; C08J 2451/00; C08J 7/047; C08J 3/02; C08J 3/03; C08J 7/0427

See application file for complete search history.

(56) References Cited

U.S. PATENT DOCUMENTS

| | | |
|---|---|---|
| 2011/0018234 A1 | 1/2011 | Bordes et al. |
| 2012/0015573 A1 | 1/2012 | Akechi et al. |
| 2015/0017859 A1 | 1/2015 | Akechi et al. |
| 2017/0136982 A1 | 5/2017 | Akechi |
| 2018/0093634 A1 | 4/2018 | Hosaka et al. |

FOREIGN PATENT DOCUMENTS

| | | | |
|---|---|---|---|
| CN | 102428227 | | 4/2012 |
| CN | 103422348 | | 12/2013 |
| CN | 104093894 | | 10/2014 |
| EP | 2813606 | A1 | 12/2014 |
| JP | 2000-303303 | A | 10/2000 |
| JP | 2000-303303 | A † | 10/2000 |
| JP | 2001-200447 | A † | 7/2001 |
| JP | 2001-288413 | A | 10/2001 |
| JP | 2007-535432 | A | 12/2007 |
| JP | 2009-074215 | A | 4/2009 |
| JP | 2009-074215 | A † | 4/2009 |
| JP | 4423853 | B2 | 3/2010 |
| WO | 2005/108671 | A2 | 11/2005 |
| WO | WO-2005108671 | A3 * | 3/2006 ............. D06N 3/128 |
| WO | 2010/137282 | A1 | 12/2010 |
| WO | 2014/123090 | A1 | 8/2014 |
| WO | 2014/123090 | A1 † | 8/2014 |
| WO | 2015/151358 | A1 | 8/2015 |
| WO | 2015/151358 | A1 † | 10/2015 |
| WO | WO2016/158858 | A1 | 10/2016 |

OTHER PUBLICATIONS

Japan Patent Office, International Search Report dated Apr. 18, 2017 for Application No. PCT/JP2017/009865, 2 pages.
Introduction to Coating Machine and Operational Technology, General Technology Center, Jan. 30, 1990, pp. 114-115.
Coating Method, Maki Bookstore, Jun. 30, 1988, pp. 58-61.
Industrial Fiber Material Handbook, The Textile Machinery Society of Japan, Jun. 25, 1979, pp. 230-231.
Third party obeservation dated Jul. 2, 2018 for PCT patent application No. PCT/JP2017/009865.
European Patent Office, Supplementary European Search Report dated Aug. 2, 2019 for Application No. 17766583.3.
Chinese Office Action in Chinese Appln. No. 201780015377.6, dated May 8, 2020, 14 pages, with English translation.
Harasaki, Introduction to coating machine and operational technology, General Technology Center, Jan. 30, 1990, pp. 231, with English Translation.
Yuji Harasaki, Introduction to Coating Machine and Operational Technology, Sogo Gijutsu Center, published on Jan. 30, 1990, pp. 114-115, last (bibliographic) page.†
Yuji Harazaki, Coating Method, Maki Shoten, published on Jun. 25, 1979, pp. 58, 61, last (bibliographic) page.†
Industrial Fiber Material Handbook, The Textile Machinery Society of Japan, published on Jun. 25, 1979, p. 231, last (bibliographic) page.†

\* cited by examiner
† cited by third party

COATED BASE FABRIC FOR AIRBAG AND METHOD FOR MANUFACTURING SAME

CROSS REFERENCE TO RELATED APPLICATIONS

This application is a U.S. National Phase Application under 35 U.S.C. § 371 of international Application PCT/P2017/009865, filed on Mar. 13, 2017, which claims the benefit of Japan Application No. 2016-052395, filed on Mar. 16, 2016, the entire contents of which are hereby incorporated by reference in their entireties.

TECHNICAL FIELD

The present invention relates to coated fabrics used in airbags for automobiles, more specifically to coated fabrics for airbags that exhibit excellent fabric properties and appearance (little variation in physical properties in the width direction of the fabric, with few coating agent dots), and methods for producing a coated fabric for airbags.

BACKGROUND ART

The installation of airbags is rapidly increasing these days as an automotive safety component. A sensor detects an impact in a vehicle collision and causes an inflator to generate a high-temperature and high-pressure gas, which immediately deploys airbags to prevent the body of the driver and the passengers, in particular their head, from hitting the steering wheel, front windshield, side windows, etc., and protect them. Recent years have seen increased practical use of not only airbags installed to the driver and passenger seats, but also other airbags, such as knee airbags, side airbags, and curtain airbags, and it is now common to install multiple airbags.

In particular, to provide extensive protection for occupants, higher capacity airbags are more likely to be installed. This requires smoother deployment of airbags than before and fabrics with smaller variation in physical properties in the width direction (in particular, variation in tear strength, which greatly affects the burst of an airbag when the airbag is deployed).

To prepare coated fabrics for airbags, the use of the knife-on-air method (also called the "floating knife coating method") is common from the standpoint of reducing the amount of coated resin and stable application of the resin. However, when resin is applied by the knife-on-air method, the resin that has gone around the reverse side of the knife deposits, and falls on the fabric, developing coating agent dots, which are beaded resin adhered to the fabric. This becomes problematic for fabric properties and appearance. A serious problem arises such that when an airbag prepared from a fabric with coating agent dots is folded, the airbag does not smoothly deploy due to the localized highly tacky portion containing coating agent dots.

A document discloses an example of a coated fabric for airbags that is prepared by coating a fabric under a contact pressure between the knife and the woven fabric of 1 to 15 N/cm, while applying a fabric tension of 500 to 3000 N/m (PTL 1). This technique attempts to achieve a proper coating width of the resin on the base fabric by setting the contact pressure between the knife blade and the fabric, and the fabric tension both within predetermined ranges. However, this document does not give much consideration to coating agent dots that affect airbag deployment and tear strength that has a great impact on bursting when an airbag deploys.

PTL 2 discloses a technique of applying higher tension to the selvages (the edge parts of a fabric) of a base fabric than to the middle part of the fabric in the width direction. PTL 2 teaches that as a method to apply high tension to the selvages, equipment called a "third support" is installed. This technique appears to be capable of applying certain tension in the width direction, but is likely to leave streaks of coating in the bowed portion of the fabric because the fabric is coated with a portion of the fabric bowed, and also possibly leads to varied tear strength in the width direction because of the generated difference in tension in the width direction of the fabric.

As noted above, sufficient research has not been done on eliminating or reducing coating agent dots, which may impair the deployment performance of airbags, and also on methods to decrease variation of tear strength in the width direction of a fabric.

CITATION LIST

Patent Literature

PTL 1: No. 4423853
PTL 2: JP2007-535432A

SUMMARY OF INVENTION

Technical Problem

An object of the present invention is to provide a coated fabric for airbags that has eliminated or reduced coating agent dots, which are not solved by traditional techniques, and that has a smaller variation of tear strength in the width direction of a fabric.

Solution to Problem

The coated fabric for airbags according to the present invention, which can solve the problems described above, includes the following subject matter.

Specifically, the present invention is as follows.
1. A coated fabric for airbags,
the coated fabric comprising a woven fabric composed of synthetic fiber filaments and having an elastomer resin applied to one surface of the woven fabric, wherein
the coefficient of variation (CV %) of tear strength in the width direction of the coated fabric is 5% or less in both the warp and weft directions, and
the number of coating agent dots is 2.0/100 m or less,
2. The coated fabric for airbags according to item 1, wherein the amount of the applied elastomer resin is 15 to 50 $g/m^2$.
3. The coated fabric for airbags according to item 1 or 2, wherein the total fineness of the filaments constituting the woven fabric is 200 to 1000 dtex.
4. The coated fabric for airbags according to any one of items 1 to 3, wherein the cover factor of the woven fabric is 1,700 to 2,500.
5. The coated fabric for airbags according to any one of items 1 to 4, wherein the elastomer resin is a solvent-free addition polymerization silicone.
6. The coated fabric for airbags according to any one of items 1 to 5, wherein the elastomer resin has a viscosity of 5000 to 40000 mPa·s.
7. A method for producing the coated fabric for airbags of any one of items 1 to 6, the method comprising applying a resin by a knife-on-air method using a knife whose front part and rear part are differently shaped.

8. A method for producing the coated fabric for airbags of any one of items 1 to 7, the method comprising pressing a knife at a running angle of the fabric of 3 to 15°.

Advantageous Effects of Invention

The present invention provides a coated fabric for airbags that has fewer coating agent dots and that has a smaller difference in variation of tear strength in the width direction of the fabric. In particular, the present invention provides a coated fabric for airbags excellent in reliability of deployment performance, fabric properties and appearance, and cost performance, even for curtain airbags that are required to have a high internal-pressure retention performance and a wider fabric area.

DESCRIPTION OF EMBODIMENTS

The following describes the present invention in detail. In the present invention, a woven fabric composed of synthetic fiber filaments refers to a fabric woven from a synthetic fiber filament yarn. The woven fabric is excellent in mechanical strength, and also excellent in the thickness that can be made thin. The structure of the woven fabric may be, for example, a plain weave, a twill weave, a sateen weave, a variation of these weaving patterns, a multiaxial woven pattern, or the like; of these, a plain-weave fabric, which is excellent in mechanical strength, is particularly preferable.

Usable synthetic fibers include, in particular, aliphatic polyamide fibers, such as nylon 66, nylon 6, nylon 46, and nylon 12; aromatic polyamide fibers, such as aramid fibers; and polyester fibers, such as polyethylene terephthalate, polytrimethylene terephthalate, and polybutylene terephthalate. Additionally, synthetic fibers include wholly aromatic polyester fibers, poly(p-phenylene benzobisoxazole) fibers (MO fibers), ultrahigh-molecular-weight polyethylene fibers, polyphenylene sulfide fibers, and polyether ketone fibers. From an economical viewpoint, polyester fibers and polyamide fibers are preferable, and polyamide 66 is particularly preferable. These fibers may be obtained from a starting material, part or all of which is a recycled material.

These synthetic fibers may contain various additives in order to make it easier to perform the yarn production and weaving process. Examples of additives include antioxidants, heat stabilizers, smoothing agents, antistatic agents, thickening agents, and flame retardants. These synthetic fibers may be solution-dyed yarns or yarns dyed after spinning. The cross-sectional surface of a single yarn may be a typical round cross-section or irregular cross-section. For the synthetic fiber, it is preferable to use a multifilament yarn containing 72 filaments or more, from the standpoint of flexibility and smoothness of the coated surface.

The boiling-water shrinkage rate of an original yarn for use is preferably 5 to 10% from the standpoint of obtaining a high-quality fabric with fewer creases. When the boiling-water shrinkage rate of an original yarn is less than 5%, shrinkage of the original yarn in the post-weaving processing treatment does not close the interstices of the woven fabric that is not coated yet (which is hereinafter referred to as a base fabric), thereby resulting in a fabric prone to increased air permeability or loose seams. When the shrinkage rate exceeds 10%, interstices are more likely to be closed in the post-weaving processing treatment; however, spinnability is extremely reduced. The boiling-water shrinkage rate its more preferably 5.5 to 9.5%.

A loom used for weaving a base fabric way be an existing loom, such as a water-jet loom, an air jet loom, and a rapier loom; and for a loom with shedding motion, a known machine, such as a Jacquard loom, may be used. A woven fabric may be subjected to scouring and washing to remove the coating agent, excessive oil components, and stains, or may be completed as a finished woven fabric without scouring.

The woven fabric may be allowed to pass through a warm water tank at 70 to 98° C. for a time period of 1 second or more and 10 minutes or less to shrink the fabric. It is preferable to apply running tension only in the traveling direction when the fabric passes through the warm water tank in order to shrink the weft without extending the fabric in the weft direction. Thereafter, the fabric may be dried until the moisture content reaches a predetermined amount in a drying step. By drying this woven fabric, a base fabric for coated fabric is obtained.

The coating resin applied to the base fabric is preferably an elastomer resin that has heat resistance, cold resistance, and flame retardancy, and most preferably a silicone based-resin. Specific examples of silicone based-resins include addition polymerization silicone rubber, such as dimethyl silicone rubber, methyl vinyl silicone rubber, methylphenyl silicone rubber, trimethyl silicone rubber, fluorosilicone rubber, methyl silicone resin, methylphenyl silicone resin, methyl vinyl silicone resin, epoxy-modified silicone resin, acrylic-modified silicone resin, and polyester-modified silicone resin. Of these, methyl vinyl silicone rubber is suitable because the rubber exhibits rubber elasticity after being cured, excellent strength and stretchability, and a cost-wise advantage.

In the present invention, the silicone based-resin for use preferably has a resin viscosity of 5000 to 40000 mPa·sec, and more preferably 7000 to 38000 mPa·sec. A resin viscosity of more than 40000 mPa·sec is not preferable because of the need for extra tension in the warp direction to achieve a coating amount of 50 g/m$^2$ or less and may damage the fabric. A resin viscosity of less than 5000 mPa·sec is also not preferable because the resin seeps into the base fabric, resulting in a failure to achieve a desired air permeability. As long as the viscosity can be adjusted to fall within the ranges described above, either a solvent-based resin or a solvent-free resin may be used. However, a solvent-free resin may be preferable, given the environmental impact.

In the present invention, the viscosity of the resin composition containing additives in addition to the resin, specifically, the viscosity of the resin actually applied to the base fabric, is considered to be "the viscosity of resin."

The alkenyl group-containing polysiloxane that constitutes the resin layer of the coated fabric of the present invention must have 2 or more alkenyl groups bonded to a silicon atom per molecule in order to form a silicone resin film having rubber elasticity after the resin has been cured. In the alkenyl group-containing polysiloxane skeleton, the silicon atom to which an alkenyl group bonds is positioned, for example, at a molecular chain end and/or in the middle of the molecular chain (somewhere in the molecular chain but not the ends). An alkenyl group-containing linear polysiloxane in which a silicon atom is bonded to both the end(s) and somewhere in the middle of the molecular chain is preferable.

The viscosity of the alkenyl group-containing polysiloxane component at 25° C. is preferably 10 to 50 Pa·sec, and more preferably 15 to 45 Pa·sec, from the standpoint of the physical characteristics, such as the adhesion, rubber strength, and blocking resistance of the cured product against fibers, and workability.

Organohydrogenpolysiloxane contained in a silicone based-resin undergoes a hydrosilylation addition reaction with an alkenyl-containing polysiloxane to thereby act as a crosslinking agent. The molecular structure of the organohydrogenpolysiloxane may be, for example, a linear structure, a cyclic structure, a branched structure, or a three-dimensional network.

Organohydrogenpolysiloxane has at least 2 (typically about 2 to 300) hydrogen atoms bonded to silicon atoms per molecule. When organohydrogenpolysiloxane has a linear structure, hydrogen atoms bonded to these silicon atoms may be positioned at the end(s) of the molecular chain or somewhere in the middle of the molecular chain (i.e., somewhere in the molecular chain but not the ends), or may be positioned both at the end(s) of the molecular chain and in the middle of the molecular chain.

Organohydrogenpolysiloxane (B) preferably has a viscosity of 0.1 to 1,000 mPa·sec at 25° C., and more preferably 0.1 to 500 mPa·sec at 25° C.

The amount of organohydrogenpolysiloxane (B) is determined such that the number of hydrogen atoms bonded to silicon atoms in component (B) is typically 1 to 20, preferably 1 to 10, and more preferably 1 to 5, per alkenyl group bonded to silicon atoms in component (A).

When a silicone based-resin is used, a reaction curing agent may be used. Typical examples include platinum and platinum compound catalysts (platinum-based catalysts). A known reaction curing agent may be used, and specific examples include platinum black, chloroplatinic acid, alcohol modified products of chloroplatinic acid, and complexes of chloroplatinic acid with olefin, aldehyde, vinyl siloxane, or an acetylene alcohol. The more a platinum compound catalyst is mixed, the more the hydrosilylation reaction is promoted. Typically, 100 to 2000 ppm of a platinum compound catalyst (on a platinum metallic amount basis) relative to a composition is added.

To improve the adhesiveness of the silicone based-resin and the base fabric, it is preferable to add an adhesive aid to the silicone based-resin. The adhesive aid is, for example, at least one member selected from the group consisting of amino-based silane coupling agents, epoxy-modified silane coupling agents, vinyl-based silane coupling agents, chloro-based silane coupling agents, and mercapto-based silane coupling agents. However, the adhesive aid is not limited to these examples.

Optionally, a reinforcing inorganic filler, such as fumed silica and dry silica, a crosslinkable silicone (silicone resin) having adjusted end groups, a non-reinforcing inorganic filler, such as calcium carbonate, calcium silicate, and titanium dioxide, for example, may also be added. The amount of an inorganic filler for use is preferably 0.1 to 200 parts by mass, and more preferably 0.1 to 100 parts by mass, based on the alkenyl-containing polysiloxane component.

Additionally, an inorganic pigment or an organic pigment may be added as a colorant. Examples of inorganic pigments include carbon black, titanium oxide, aka bengara (red pigment), kuro bengara (black pigment), titanium yellow, and cobalt blue, and examples of organic pigments include condensed azo pigments (yellow, brown, red), isoindolinone pigments (yellow, orange), quinacridone pigments (red, purple), diketopyrrolopyrrole pigments (orange, red, purple), anthraquinone pigments (yellow, red, blue), dioxazine pigments (purple), benzimidazolone pigments (orange), copper phthalocyanine pigments (blue), and allyl amide pigments (yellow).

In the present invention, to reduce coating agent dots and variation of tear strength in the width direction of the coated fabric, the knife used in fabric coating and the running angle of the fabric on the support right behind the knife are very important. To apply the resin, a known resin coating method may be used. Taking into consideration the ease of adjustment of the coating amount and the impact of foreign matter (protruding objects) contamination, a knife-coating method is preferable, and a knife-on-air method is more preferable. The knife for use may be either an integrated doctor blade or a blade knife, and is preferably a blade knife from the standpoint of knife maintenance. When a knife-on-bed method is used, it is easy to make resin seep inside the woven fabric. However, it is difficult to allow resin to be present on the surface of the woven fabric (the surface of the fabric to be coated), in particular on the top portion, thereby likely failing to achieve the reduced permeability generally required for the coated fabric.

The knife blade, during coating, holds the coating resin, and spreads the resin in the width direction to achieve a uniform coating amount of the resin. The edge of the knife blade for use in knife coating typically has a semicircular shape, an angular shape, and the like, largely for the purpose of adjusting the coating amount of the resin. The present inventor found that the use of a knife that has an edge whose front part and rear 35 part are differently shaped reduces damage to the fabric and also eliminates or reduces coating agent dots.

Preferably used knives are typically those with a semicircular shape whose angle is within 160° or more at the portion at which the knife blade comes into contact with a fabric (i.e., the edge shape of a knife). Even when coating is performed with a knife having a semicircular shape, coating agent dots are observed. The probable reason is that coating resin is compressed along the knife blade, that after the resin applied to a fabric, a tiny amount of the resin is left without being applied to the fabric, and that after passage of the knife blade and when the fabric is released from the pushing pressure from the knife blade, the tiny amount of resin goes around the reverse side of the knife blade. The tiny amount of the resin would be accumulated to such a degree that it can be visually observed in the production process, and would finally drop onto the fabric, thereby forming coating agent dots.

Figure 3:
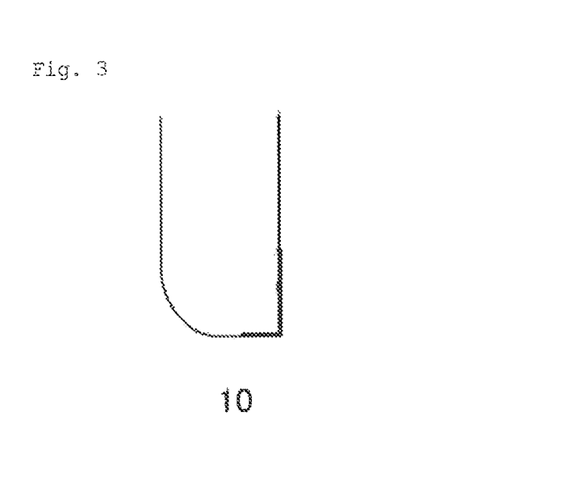
FIG. 3 illustrates the edge shape of a knife used in Examples disclosed in this specification.

In the present invention, a knife for use preferably has a shape, for example, such that the front part is a quarter circular shape and the rear part has an angular shape (right angle shape) (FIG. 3). Other options include a combination of a quarter circular shape at the front part and a partly cut angular shape at the rear part (FIG. 4) and other various combinations. The edge having a quarter circular shape at the front part (round shape) and an angular shape (right angle shape) at the rear part is most preferable.

A preferable example of the knife is one having a quarter circular shape whose radius is 0.2 mm to 1.5 mm at the front part. The thickness of the portion of the blade at which the circular shape starts is preferably 0.4 mm to 3.0 mm. A thickness of the blade portion within this range prevents the resin coating amount from being overly large and minimizes the damage to the fabric. From the standpoint of knife durability, the thickness of the knife blade is preferably uniform from the edge at which the knife comes into contact with a fabric through the opposite edge at which the blade begins.

Additionally, the running angle of the fabric, when being pressed by the knife blade, is preferably 3 to 0.5°, and more preferably 4 to 10°. A running angle of less than 3° is not preferable because resin cannot be prevented from going around the reverse side of the blade, regardless of a change in the shape of the knife blade, thereby increasing coating agent dots. Although a running angle of more than 15' can decrease coating agent dots, an overly strong force presses the fabric, thereby resulting in the fabric being coated with an excessive amount of resin and difficulty in achieving the uniformity of the physical properties in the width direction of the fabric.

The running angle of a fabric stated above refers to an angle made by a reference line (a line that connects the supports present before and after the knife) and the actual fabric when the fabric is pressed by the knife blade during coating. The supports may be those having a flat surface called a "bed," or rollers that move the fabric forward. When beds are used, the flat surface of the beds may be arranged along the running direction of the fabric (in parallel with the ground). Alternatively, to change the height of the reference line for the fabric or to adjust the tension for smoothness of the fabric, the knife beds may be tilted and disposed. An overly large angle of inclination is not preferable due to the occurrence of fabric damage. The angle of inclination is preferably −30° to +30', and more preferably −20° to +20°, when the angle of inclination of the beds disposed in parallel with the ground is 0°. When rollers are used, the line that connects the position at which a roller finally comes into contact with the fabric or the position at which a coated fabric first comes into contact with a roller may be determined to be a reference line.

The angle made by the reference line and the fabric is measured at two points, one before and the other after the knife blade passes, and the smaller angle may be adopted. Typically, the angle after coating is likely to be smaller than the angle before the coating blade, and the angle after coating is usually adopted.

It is preferable to apply tension while adding a predetermined temperature to the fabric before coating, because this can eliminate or reduce coating agent dots. The probable reason is that adding a predetermined tension with heating makes the fabric smooth, which makes it unlikely for a small amount of resin after coating to remain. The temperature of heating and the tension are not particularly limited as long as the density of the base fabric does not change. The temperature is preferably 80 to 130° C., and more preferably 90 to 120° C. A temperature of below 80° C. is unlikely to bring about the effect in smoothing the base fabric. A temperature of over 120° C. results in an unsmooth fabric, because heat transfer differs between the middle part and the selvage portion of a base fabric that has greatly wavy selvages. For the heating apparatus, a known method, such as a method in which a fabric passes through heated rolls or a method in which a fabric passes through a heating oven, may be used. The lower limit of the tension may be determined such that the fabric does not crease at the running tension, and the upper limit of the tension may be determined such that the density of the fabric does not change at the running tension.

A feature of the coated fabric of the present invention is that the variation in tear strength in the width direction is small. The tear strength in the width direction is determined by equally dividing a coated fabric into 12 portions in the width direction of the fabric, and measuring the tear strength of 10 points of the 10 portions in the middle of the fabric. From the measured values, the average and dispersion are determined; the dispersion is divided by the average, and the result is indicated by percentage (coefficient of variation). This value is 5% or less, preferably 4.5% or less, and more preferably 4.0% or less in both the warp and weft directions. When the coefficient of variation of tear strength in the width direction is 5% or less, stable deployment performance of an airbag is achieved due to a small difference in tear strength between the fabric portions of the airbag.

The number of coating agent dots in the coated fabric of the present invention is 2.0/100 m or less. When the coating agent dot targeted by the present invention is 2 mm or more in its long portion, the number of coating agent dots is 2.0/100 m or less, and preferably 1.0/100 m or less in an inspected 2000-m coated fabric. When the number of coating agent dots is 2.0/100 m or less, an advantageous airbag deployment behavior is achieved. These coating agent dots can be found by visual inspection.

The method for drying and curing the applied coating agent may be a typical heating method, such as with hot air, infrared light, or microwaves. Regarding the heating temperature and heating time period, it is sufficient if the temperature reaches the point at which the elastomer resin is cured. Preferably, the heating temperature is 150 to 220° C., and the heating time period is 0.2 to 5 minutes.

The total fineness of the filament yarns constituting the woven fabric (base fabric) is preferably 200 to 1000 dtex. A total fineness of more than 1000 dtex increases the thickness of the woven fabric (base fabric), more likely decreasing the packageability of the airbag. A total fineness of less than 200 dtex is likely to decrease the mechanical characteristics of airbags when activated, such as the tear mechanical characteristics of coated fabrics.

The cover factor of the woven fabric (base fabric) is preferably 1,700 to 2,500, and more preferably 1,900 to 2,450. A cover factor of less than 1,700 decreases the physical characteristics (e.g., tensile strength) required of airbags, while a cover factor of more than 2,500 places a limitation on the weaving process and packageability.

EXAMPLES

The following describes the present invention in detail with reference to Examples. However, the present invention is not limited the Examples. The various evaluations described in the Examples were performed in accordance with the following methods.

(1) Total Fineness

The total fineness was measured in accordance with the method prescribed in JIS L-1095 9.4.1.

(2) Number of Filaments

The number of filaments on a photograph of the cross-sectional surface of a filament yarn was counted.

(3) Density of Woven Fabric

The density of the woven fabric was measured in accordance with the method prescribed in JIS L-1096 8.6.1.

(4) Cover Factor (CF)

CF=√(total fineness of warp)×warp density+√(total fineness of weft)×weft density The unit for the total fineness is dtex, and the unit for the weaving density is yarn/2.54 cm.

(5) Coating Amount

A coated fabric, after the applied elastomer resin was cured, was sampled as a 5-cm×5-cm piece, and the mass was measured. The sample was immersed in a solvent for dissolving only the fibers of the base fabric (e.g., the solvent for polyamide 66 is hexafluoroisopropanol) to allow the base fabric to dissolve. Thereafter, only the elastomer resin layer, which is an insoluble matter, was recovered, and washed with acetone, followed by vacuum drying and measuring the sample weight. The amount of coating is indicated by mass per m² (g/m²), (6) Tear Strength in the Width Direction of Coated Fabric The tear strength in the width direction of coated fabrics was measured in accordance with the method prescribed in ISO13937-2. However, sampling was performed by equally dividing a coated fabric into 12 pieces in the width direction, and measuring the 10 pieces taken from the middle of the fabric, excluding the two pieces of the opposite ends. Sampling in the warp direction was performed in the middle as much as possible of each piece of the 10 pieces in the middle of the fabric. Sampling in the weft direction was performed from the edge of the divided pieces such that 5 pieces on the Nz side were torn apart from the Nz direction, and that 5 pieces on the side opposite the Nz side were torn apart from the side opposite the Nz side.

(7) Number of Coating Agent Dots

The number of coating agent dots of 2 mm or more in the longest portion on a 2000-m coated fabric was visually counted, and the number of coating agent dots per 100 m was calculated.

Example 1

A plain-weave fabric was woven from a polyamide 66 multifilament yarn containing 72 filaments that had an original yarn strength of 8.4 cN/dtex and a total fineness of 470 dtex, using a water-jet loom. Subsequently, the fabric was subjected to shrinkage processing with boiling water at 95° C. and dry finishing at 130° C., thereby obtaining a woven fabric with a warp density of 46 yarns/2.54 cm, a weft density of 46 yarns/2.54 cm, and a cover factor of 1,994.

Figure 1:
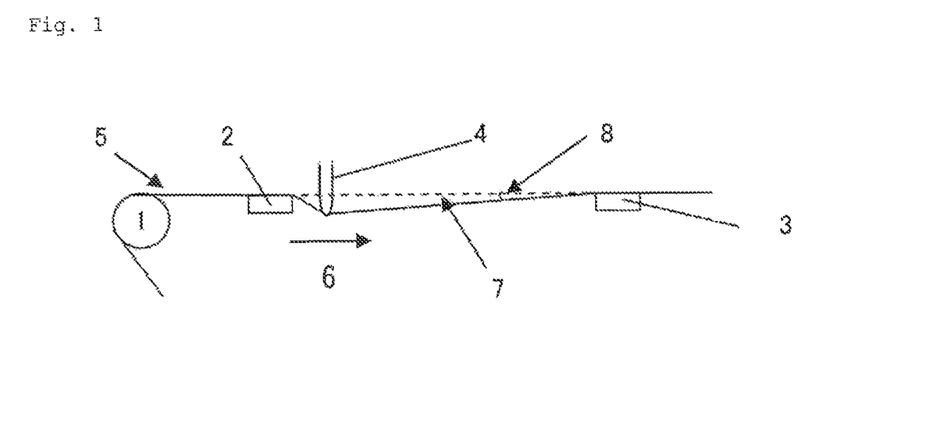
FIG. 1 illustrates a schematic view of the coating step in the present invention (an embodiment).
Figure 2:
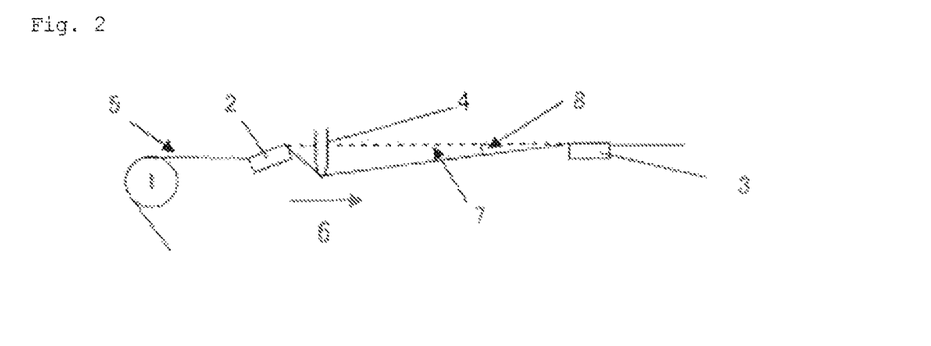
FIG. 2 illustrates a schematic view of the coating step in the present invention (an embodiment in which the support before the knife is tilted at a +20° angle).

This woven fabric (base fabric) was coated with an apparatus such as that shown in FIG. 1. The knife for use had a 1.0-mm thick edge, with the front part having a round shape, and the rear part having a right-angle shape (FIG. 3).

A solvent-free addition polymerization vinyl methyl silicone resin having a resin viscosity of 14000 mPa·sec was applied to one side of this woven fabric (base fabric) by a knife-on-air method. Thereafter, curing treatment was performed at 200° C. for 1 minute, thereby obtaining a coated fabric having a coating amount of 25 g/m². The heating roller used before coating was set at 110° C., and the running angle made by the knife and the fabric on the support right behind the knife was 8°.

The characteristics of the obtained coated fabric were evaluated, and Table 1 shows the results. The obtained coated fabric had a low coefficient of variation of tear strength in the width direction, and exhibited excellent fabric properties and appearance in terms of coating agent dots.

Example 2

A plain-weave fabric was woven from a polyimide 66 multifilament yarn containing 144 filaments that had an original yarn strength of 8.3 cN/dtex and a total fineness of 470 dtex, using a water-jet loom. Subsequently, the fabric was subjected to shrinkage processing with boiling water at 95° C. and dry finishing at 130° C., thereby obtaining a woven fabric with a warp density of 46 yarns/2.54 cm, a weft density of 46 yarns/2.54 cm, and a cover factor of 1,994.

This woven fabric (base fabric) was coated in the same manner as in Example 1. The knife for use had a 0.45-mm thick edge, with the front part having a round shape, and the rear part having a right-angle shape (FIG. 3).

A solvent-free addition polymerization vinyl methyl silicone resin having a resin viscosity of 18000 mPa·sec was applied to one side of this woven fabric (base fabric) by a knife-on-air method. Curing treatment was then performed at 200° C. for 1 minute, thereby obtaining a coated fabric having a coating amount of 20 g/m². The heating roller used before coating was set at 110° C., and the running angle made by the knife and the fabric on the support right behind the knife was 5°

The characteristics of the obtained coated fabric were evaluated, and Table 1 shows the results. The obtained coated fabric had a low coefficient of variation of tear strength in the width direction, and exhibited excellent fabric properties and appearance in terms of coating agent dots.

Example 3

Figure 4:
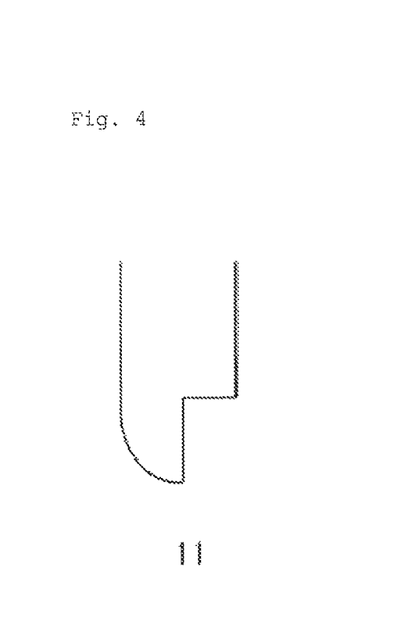
FIG. 4 illustrates the edge shape of a knife used in Examples disclosed in this specification.

The same woven fabric (base fabric) as in Example 2 was coated in the same manner as in Example 1. The knife for use had a 0.60-mm thick edge, with the front part having a round shape, and the rear part having a partially cut angular shape (FIG. 4). A solvent-free addition polymerization vinyl methyl silicone resin having a resin viscosity of 37000 mPa·sec was applied to one side of this woven fabric (base fabric) by a knife-on-air method. Thereafter, curing treatment was performed at 200° C. for 1 minute, thereby obtaining a coated fabric having a coating amount of 25 g/m². The heating roller used before coating was set at 115° C., and the running angle made by the knife and the fabric on the support right behind the knife was 4°

The characteristics of the obtained coated fabric were evaluated, and Table 1 shows the results. The obtained coated fabric had a low coefficient of variation of tear strength in the width direction, and exhibited excellent fabric properties and appearance in terms of coating agent dots.

Example 4

A plain-weave fabric was woven from a polyamide 66 multifilament yarn containing 108 filaments that had an original yarn strength of 8.4 cN/dtex and a total fineness of 3.50 dtex, using a water-jet loom. Subsequently, the fabric was subjected to shrinkage processing with boiling water at 95° C. and dry finishing at 130° C., thereby obtaining a woven fabric with a warp density of 55 yarns/2.54 cm, a weft density of 55 yarns/2.54 cm, and a cover factor of 2,208.

This woven fabric (base fabric) was coated in the same manner as in Example 1. The knife for use had a 0.35-mm thick edge, with the front part having a round shape, and the rear part having a right-angle shape (FIG. 3).

A solvent-free addition polymerization vinyl methyl silicone resin having a resin viscosity of 17000 mPa·sec was applied to one side of this woven fabric (base fabric) by a knife-on-air method. Curing treatment was then performed at 200° C. for 1 minute, thereby obtaining a coated fabric having a coating amount of 20 g/m². The beating roller used before coating was set at 120° C., and the running angle made by the knife and the fabric on the support right behind the knife was 5°

The characteristics of the obtained coated fabric were evaluated, and Table 1 shows the results. The obtained coated fabric had a low coefficient of variation of tear strength in the width direction, and exhibited excellent fabric properties and appearance in terms of coating agent dots.

Example 5

A plain-weave fabric was woven from a polyamide 66 multifilament yarn containing 72 filaments that had an original yarn strength of 8.5 cN/dtex and a total fineness of 235 dtex, using a water-jet loom. Subsequently, the fabric was subjected to shrinkage processing with boiling water at 95° C. and dry finishing at 130° C., thereby obtaining a woven fabric with a warp density of 73 yarns/2.54 cm, a weft density of 73 yarns/2.54 cm, and a cover factor of 2,238.

This woven fabric (base fabric) was coated in the same manner as in Example 1. The knife for use had a 0.50-mm thick edge, with the front part having a round shape, and the rear part having a right-angle shape (FIG. 3).

A solvent-free addition polymerization vinyl methyl silicone resin having a resin viscosity of 14000 mPa·sec was applied to one side of this woven fabric (base fabric) by a knife-on-air method. Curing treatment was then performed at 200° C. for 1 minute, thereby obtaining a coated fabric having a coating amount of 17 g/m². The heating roller used before coating was set at 110° C., and the running angle made by the knife and the fabric on the support right behind the knife was 7°

The characteristics of the obtained coated fabric were evaluated, and Table 1 shows the results. The obtained coated fabric had a low coefficient of variation of tear, strength in the width direction, and exhibited excellent fabric properties and appearance in terms of coating agent dots.

Example 6

A plain-weave fabric was woven from a polyamide 66 multifilament yarn containing 144 filaments that had an original yarn strength of 8.4 cN/dtex and a total fineness of 940 dtex, using a water-jet loom. Subsequently, the fabric was subjected to shrinkage processing with boiling water at 95° C. and dry finishing at 130° C., thereby obtaining a woven fabric with a warp density of 37 yarns/2.54 cm, a weft density of 37 yarns/2.54 cm, and a cover factor of 2,269.

This woven fabric (base fabric) was coated in the same manner as in Example 1. The knife for use had a 2.50-nm thick edge, with the front part having a round shape, and the rear part having a right-angle shape (FIG. 3).

A solvent-free addition polymerization vinyl methyl silicone resin having a resin viscosity of 8000 mPa·sec was applied to one side of this woven fabric (base fabric) by a knife-on-air method. Curing treatment was then performed at 200° C. for 1 minute, thereby obtaining a coated fabric having a coating amount of 45 g/m². The heating roller used before coating was set at 110° C., and the running angle made by the knife and the fabric on the support right behind the knife was 8°.

The characteristics of the obtained coated fabric were evaluated, and Table 1 shows the results. The obtained coated fabric had a low coefficient of variation of tear strength in the width direction, and exhibited excellent fabric properties and appearance in terms of coating agent dots.

Comparative Example 1

Figure 6:
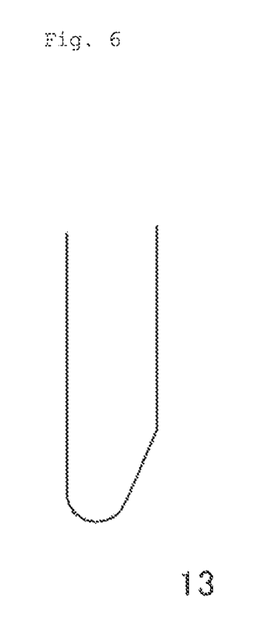
FIG. 6 illustrates the edge shape of a knife used in Comparative Examples disclosed in this specification.

The same base fabric as in Example 2 was coated with the same resin by the same coating method as in Example 2, except that the knife for use had a round edge, the shape of which was the same between the front and rear parts (FIG. 6). The characteristics of the obtained coated fabric were evaluated, and Table 2 shows the results. Although the obtained coated fabric had a coefficient of variation of tear strength in the width direction within the predetermined range, the fabric was not excellent in fabric properties and appearance due to the development of many coating agent dots.

Comparative Example 2

Figure 5:
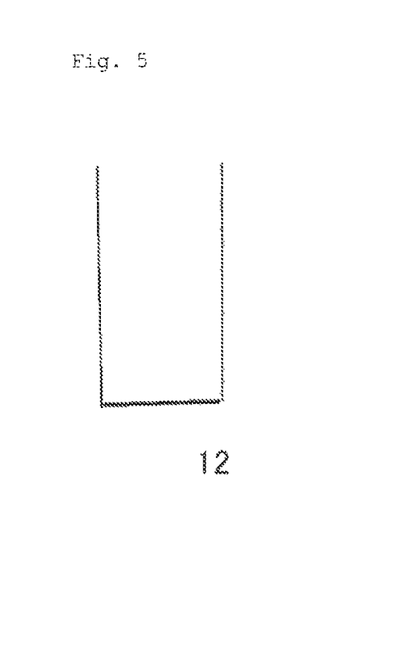
FIG. 5 illustrates the edge shape of a knife used in Comparative Examples disclosed in this specification.

The same base fabric as in Example 3 was coated with the same resin by the same coating method as in Example 3, except that the knife for use had an angular edge, the shape of which was the same between the front and rear parts (FIG. 5).

The characteristics of the obtained coated fabric were evaluated, and Table 2 shows the results. Although the obtained coated fabric exhibited excellent fabric properties and appearance in terms of coating agent dots, the coefficient of variation of tear strength in the width direction of the fabric was high in both the warp and weft directions.

Comparative Example 3

The same base fabric as in Example 4 was coated in the same manner as in Example 4, except that the running angle made by the knife and the fabric on the support right behind the knife was set at 13°.

The characteristics of the obtained coated fabric were evaluated, and Table 2 shows the results. Although the obtained coated fabric exhibited excellent fabric properties and appearance in terms of coating agent dots, the coefficient of variation of tear strength in the width direction of the fabric was high in both the warp and weft directions because of the great damage made to the fabric by the overly strong press force made by the knife blade.

Comparative Example 4

The same base fabric as in Example 4 was coated in the same manner as in Example 4, except that the running angle made by the knife and the fabric on the support right behind the knife was set at 2°.

The characteristics of the obtained coated fabric were evaluated, and Table 2 shows the results. The obtained coated fabric had a greater amount of resin adhered than the fabric of Example 4. Additionally, the fabric was not excellent in fabric properties and appearance due to the development of many coating agent dots.

TABLE 1

|  |  | Example 1 | Example 2 | Example 3 | Example 4 | Example 5 | Example 6 |
|---|---|---|---|---|---|---|---|
| Total Fineness | dtex | 470 | 470 | 470 | 350 | 235 | 940 |
| Number of Filaments | Yarn | 72 | 144 | 144 | 108 | 72 | 144 |
| Weaving Density (Warp/Weft) | Yarn/2.54 cm | 46/46 | 46/46 | 46/46 | 55/55 | 73/73 | 37/37 |
| Cover Factor | — | 1,994 | 1,994 | 1,994 | 2,058 | 2,238 | 2,269 |
| Coating Method | — | Knife on Air | Knife on Air | Knife on Air | Knife on Air | Knife on Air | Knife on Air |
| Knife for Use (Front/Rear) | — | Round/Right Angle | Round/Right Angle | Round/Partially Cut Angular | Round/Right Angle | Round/Right Angle | Round/Right Angle |
| Thickness of Knife Edge | mm | 1.00 | 0.45 | 0.60 | 0.35 | 0.50 | 2.50 |
| Running angle of a fabric when a knife is pressed | ° | 8 | 5 | 4 | 5 | 7 | 8 |
| Heating Roller Temperature | ° C. | 110 | 110 | 115 | 120 | 110 | 110 |
| Type of Elastomer Resin | — | Solvent-free Silicone | Solvent-free Silicone | Solvent-free Silicone | Solvent-free Silicone | Solvent-free Silicone | Solvent-free Silicone |
| Viscosity of Elastomer Resin | mPa · s | 14000 | 18000 | 37000 | 17000 | 14000 | 8000 |
| Coating Amount | g/m² | 25 | 20 | 25 | 20 | 17 | 45 |
| Coefficient of Variation (CV %) of Tear Strength in the Width Direction | Warp % | 0.4 | 1.2 | 2.3 | 1.5 | 0.9 | 4.0 |
|  | Weft | 2.2 | 3.5 | 3.2 | 3.9 | 2.1 | 4.2 |
| Number of Coating agent dots | Per 100 m | 0 | 0.5 | 0.6 | 0 | 0.2 | 0.8 |

TABLE 2

|  |  | Comparative Example 1 | Comparative Example 2 | Comparative Example 3 | Comparative Example 4 |
|---|---|---|---|---|---|
| Total Fineness | dtex | 470 | 470 | 350 | 350 |
| Number of Filaments | Yarn | 144 | 144 | 108 | 108 |
| Weaving Density (Warp/Weft) | Yarn/2.54 cm | 46/46 | 46/46 | 55/55 | 55/55 |
| Cover Factor | — | 1,994 | 1,994 | 2,058 | 2,058 |
| Coating Method | — | Knife on Air | Knife on Air | Knife on Air | Knife on Air |
| Knife for Use (Front/Rear) | — | Round/Round | Right Angle/Right Angle | Round/Right Angle | Round/Right Angle |
| Thickness of Knife Edge | mm | 0.45 | 0.60 | 0.35 | 0.35 |
| Running angle of a fabric when a knife is pressed | ° | 5 | 4 | 18 | 2 |
| Heating Roller Temperature | ° C. | 110 | 110 | 120 | 120 |
| Type of Elastomer Resin | — | Solvent-free Silicone | Solvent-free Silicone | Solvent-free Silicone | Solvent-free Silicone |
| Viscosity of Elastomer Resin | mPa · s | 18000 | 18000 | 17000 | 17000 |
| Coating Amount | g/m² | 20 | 25 | 20 | 35 |
| Coefficient of Variation (CV %) of Tear Strength in the Width Direction | Warp % | 3.5 | 6.2 | 5.1 | 2.8 |
|  | Weft | 3.8 | 8.3 | 6.3 | 4.2 |
| Number of Coating agent dots | Per 100 m | 20 | 0.8 | 0 | 12 |

INDUSTRIAL APPLICABILITY

The coated fabric for airbags of the present invention has fewer coating agent clots and maintains uniform tear strength physical properties in the width direction of the fabric. Thus, when used in airbags that are particularly required to have a high internal-pressure retention performance, the coated fabric exhibits excellent fabric properties and appearance, as well as reliability, and is excellent in cost-performance due to little loss in cutting the fabric. Accordingly, the coated fabric makes a great contribution to industries.

DESCRIPTION OF THE REFERENCE NUMERALS

1 A roller placed before the knife of the coating step
2 A support placed before the knife of the resin coating step
3 A support placed after the knife of the resin coating step
4 A knife
5 A fabric
6 The direction in which a fabric advances
7 A reference line
8 A running angle made by the reference line and the fabric
10 An example of the edge shape of a knife for use in the present invention (front part semicircle, rear part: angular)
11 An example of the edge shape of a knife for use in the present invention (front part: semicircle, rear part: cut in an angular shape)
12 An example of the edge shape of a knife for use in the present invention (front part: angular, rear part: angular)
13 An example of the edge shape of a knife for use in the present invention (front part: round, rear part: round)

The invention claimed is:

1. A coated fabric for airbags,
the coated fabric comprising a woven fabric composed of synthetic fiber filaments and having a coating comprising an elastomer resin on one surface of the woven fabric, wherein
the coating is obtained by applying the elastomer resin on the surface by a knife-on-air method,
the coated fabric has a coefficient of variation (CV %) of tear strength in the width direction of 5% or less in both the warp and weft directions, and
the coated fabric has a number of coating agent dots of 2.0/100 m or less.

2. The coated fabric for airbags according to claim 1, wherein the amount of the applied elastomer resin is 15 to 50 g/m².

3. The coated fabric for airbags according to claim 2, wherein the total fineness of the filaments constituting the woven fabric is 200 to 1000 dtex.

4. The coated fabric for airbags according to claim 2, wherein the cover factor of the woven fabric is 1,700 to 2,500.

5. The coated fabric for airbags according to claim 2, wherein the elastomer resin is a solvent-free addition polymerization silicone.

6. The coated fabric for airbags according to claim 2, wherein the elastomer resin has a viscosity of 5000 to 40000 mPas.

7. The coated fabric for airbags according to claim 1, wherein the total fineness of the filaments constituting the woven fabric is 200 to 1000 dtex.

8. The coated fabric for airbags according to claim 7, wherein the cover factor of the woven fabric is 1,700 to 2,500.

9. The coated fabric for airbags according to claim 7, wherein the elastomer resin is a solvent-free addition polymerization silicone.

10. The coated fabric for airbags according to claim 7, wherein the elastomer resin has a viscosity of 5000 to 40000 mPa·s.

11. The coated fabric for airbags according to claim 1, wherein the cover factor of the woven fabric is 1,700 to 2,500.

12. The coated fabric for airbags according to claim 11, wherein the elastomer resin is a solvent-free addition polymerization silicone.

13. The coated fabric for airbags according to claim 11, wherein the elastomer resin has a viscosity of 5000 to 40000 mPa·s.

14. The coated fabric for airbags according to claim 1, wherein the elastomer resin is a solvent-free addition polymerization silicone.

15. The coated fabric for airbags according to claim 14, wherein the elastomer resin has a viscosity of 5000 to 40000 mPa·s.

16. The coated fabric for airbags according to claim 1, wherein the elastomer resin has a viscosity of 5000 to 40000 mPa·s.

17. A method for producing the coated fabric for airbags of claim 1, the method comprising applying a resin by a knife-on-air method using a knife whose front part and rear part are differently shaped.

18. A method for producing the coated fabric for airbags of claim 1, the method comprising pressing a knife at a running angle of the fabric of 3 to 15°.

* * * * *